May 20, 1969

J. E. MEGLES 3,445,316

METHOD OF DIFFERENTIAL CHEMICAL
TEMPERING GLASS AND ARTICLE
Filed April 14, 1966

THERMAL TEMPER

CHEMICAL TEMPER

COMPOSITE

EXCHANGED IN DEPTH

EXCHANGED IN SURFACE ONLY FOR SCRATCH RESISTANCE

INVENTOR.
John E. Megles
BY
ATTORNEY

United States Patent Office 3,445,316
Patented May 20, 1969

3,445,316
METHOD OF DIFFERENTIAL CHEMICAL
TEMPERING GLASS AND ARTICLE
John E. Megles, Corning, N.Y., assignor to Corning
Glass Works, Corning, N.Y., a corporation of New
York
Filed Apr. 14, 1966, Ser. No. 542,570
Int. Cl. B32b 7/02, 17/00
U.S. Cl. 161—1                                    2 Claims

ABSTRACT OF THE DISCLOSURE

This invention relates to a glass article strengthened by compressive stresses in a surface zone balanced by tension in an inner zone. It is particularly concerned with strengthening a glass article which has a peripheral or rim portion that is more vulnerable to impact breakage than an interior portion which it encloses or surrounds.

---

The invention is particularly concerned with hollow glassware such as tumblers, stemware, lightingware globes, jars and other containers. However, it may also be embodied in other glass articles having a peripheral or rim portion such as tableware, glass piping, and volumetric laboratory ware.

It is well-recognized that the utility of glass as a product material is severly limited by the normally fragile nature of glass, especially in products having a relatively thin wall. The cause of this fragility of glassware is commonly ascribed to the existence of extremely minute checks or cracks in the glass surface. A commonly employed technique for increasing the strength of a glass article involves generating a system of compressive stresses in a thin surface zone on the article that is balanced by tension in an inner zone. Thermal tempering is the traditional commercial method for developing such a stress pattern in glassware. In recent years, however, various methods of ion exchange or chemical strengthening, sometimes referred to as chemical tempering in contrast to thermal tempering, have been devised.

In the process of thermal tempering, the glass is heated to a temperature near its softening point. The glass article is then removed from the heating medium and the surfaces thereof rapidly chilled to below the setting point of the glass, i.e., the temperature at which a molten glass is deemed to have become rigid. Thus, the exterior layer of the glass article quickly becomes contracted and rigid while the interior is still fluid and expanded. As the glass article is cooled to a constant ambient temperature, the interior tries to contract but it is restrained by the rigid outer envelope. Hence, when the glass temperatures reach equilibrium, the stresses at the surface become highly compressive and are balanced by tensile stresses within the interior of the glass article.

In ion exchange strengthening or chemical tempering, a monovalent metal ion, generally an alkali metal ion, is removed from a relatively thin surface layer of a glass article and, in most instances, this removal is succeeded by a replacement of the ion with another monovalent metal ion. One such method contemplates conducting the ion exchange at a temperature above the strain point of the glass. This exchange in engendered between particular metal ions so as to yield a surface layer of glass having a lower coefficient of thermal expansion than the parent glass. The new surface glass then acts as a compression layer on the glass article.

A second method of ion exchange strengthening contemplates the exchange of a small monovalent metal ion in the surface layer of a glass article with a monovalent metal ion having a larger ionic diameter. This exchange is conducted at a temperature below the strain point of the glass such that the compressive stresses set up by the substitution of a large ion for a small one in the surface of the glass are not relaxed by rearrangement of the glass structure to accommodate the larger ions. This second method is of special interest in carrying out the process of the present invention.

By properly selecting the composition of the glass article and the ion exchange conditions, the latter method of ion exchange, wherein a relatively large ion is exchanged for a smaller ion, permits the securing of extremely high flexural strengths that are several times those hitherto obtainable by thermal tempering. However, when this method of ion exchange strengthening was employed in the production of glass tumblers, an unusual problem of delayed breakage was encountered. The nature of this problem was such that breakage might occur, either in storage or in use, from impact damage wrought at some much earlier time. While the problem is of particular significance in connection with tableware, particularly glass tumblers, it may occur in any form of ion exchange strengthened glassware.

This problem is further described in a companion application, Ser. No. 307,383, filed Sept. 9, 1963, and assigned to a common assignee. This companion application proposes a particular profile or pattern of compressive stresses, such as are developed by a combination of ion exchange and thermal strengthening procedures, as a solution to the delayed breakage problem while still minimizing a further problem of explosive fracture.

The latter manifests itself by a violent scattering of broken pieces when breakage occurs in a glass article. The phenomenon is associated with the magnitude of tension in the interior zone of a strengthened glass article, and the violence of scattering is directly related to the maximum tension in the article. Thus, as more fully explained in the above-identified application, the problem of delayed breakage appears to be associated with the profile or pattern of compressive stresses in an article, whereas the explosive breakage situation is a direct function of tension. The latter is a function of both the magnitude of compressive stress and the depth of the compressive stress pattern.

The present invention is essentially an extension and/or modification of the principles enunciated in the previously-mentioned pending application. That application described a particular embodiment which involves developing a uniform pattern or profile of compressive stresses over the entire surface of an article. I have now found, while this embodiment has certain advantages, it is not necessarily the best manner of applying the principles of stress pattern control, particularly in strengthening a hollow glass article such as a tumbler.

More particularly, I have found that, while an overall uniform stress pattern minimizes delayed breakage in a tumbler, the problem is not completely eliminated. I have also learned that by far the most frequent source of delayed breakage in a tumbler is in the "heel" thereof, that is, the base and lower portion of the wall adjacent to the base. However, it is well-recognized that the rim portion of the tumbler is the traditional source of ordinary breakage.

I have further found that I can produce a greatly improved tumbler by strengthening the rim portion in a different manner and to a different degree than the remainder of the tumbler, whereby the compressive stress pattern or profile in the rim portion differs from that in the remainder of the tumbler. I have found that by utilizing this differential strengthening practice I can essentially eliminate the problem of delayed breakage without seriously increasing the tendency of the glass to exhibit explosive breakage or scattering.

Thus, my invention is directed toward glass articles of such configurations that at least one portion thereof is more vulnerable to mechanical breakage than the principal part of the article. Hence, as was discussed above, the rim of a glass tumbler is more vulnerable to traditional mechanical breakage than the thicker-walled base and heel of the tumbler. In the following description of this invention, this portion of a glass article which is more vulnerable to traditional mechanical breakage will be defined as the "appurtenant portion." Thus, the rim of a tumbler is the appurtenant portion thereof.

My invention lies in developing a different stress profile in the appurtenant portion from that developed in the principal part of the glass article. The profile in the appurtenant portion is characterized by having a very high compressive stress value at the glass surface, a relatively shallow point of transition from compression to tension, and a steep gradient between these two points. In contrast with this, the profile in the principal part of the glass article has a lower compressive stress value at the surface, a relatively deep point of transition from compression to tension, and a more gradual gradient between these two points.

The attainment of these stress profiles is accomplished through a combination of thermal tempering and an ion exchange strengthening of the large-ion-for-small-ion type described above. Hence, a glass article having an appurtenant portion can be strengthened to improve the resistance of the appurtenant portion to mechanical breakage and to virtually eliminate delayed breakage in the principal part of the article by first subjecting the entire glass article to a thermal tempering treatment after which the appurtenant portion only is subjected to an ion exchange strengthening treatment.

The overall thermal tempering treatment may be carried out in accordance with known thermal tempering practice. A glass article, either taken directly from the forming mold or after cooling, is brought to a temperature equal to or near the softening point of the glass. This may be accomplished by inserting the article in an electric furnace or other heating chamber maintained at or above the temperature of the glass softening point for a short time. Normally, the glass article is heated to its maximum temperature as rapidly as possible without introducing checks in the glass, the maximum temperature being just below that at which appreciable deformation or distortion occurs in the form or shape of the article.

The hot glass article is then transferred as rapidly as possible, that is, with as little heat loss as possible, to a molten salt bath. This bath will be at a temperature such that the surface of the article is chilled below the glass setting temperature. Normally the bath temperature will be somewhat below the strain point of the glass so that a maximum degree of stress is obtained from the thermal quench without crazing or cracking of the glass surface from the thermal shock. The glass article is then held in the salt bath for a period of several seconds, e.g., 15 seconds, to attain temperature equilibrium throughout the glass and to effect sufficient ion exchange for a purpose to be described shortly.

Providing a suitable salt bath has been selected, the glass article may then be partially removed and held in the bath with its appurtenant or rim portion only immersed in the salt bath for a further ion exchange treatment. For ease in handling, however, it is frequently convenient to completely remove the article and place it in a rack or other holder for the further salt bath treatment.

In accordance with the particular feature of the present invention, this further treatment is limited to the appurtenant or edge portion of an article. In treating a six-ounce glass tumbler having a four-inch high wall section, it is desirable to restrict the treatment to that portion of the wall beginning at the rim and extending a half inch from the rim.

The duration of the ion exchange treatment will depend somewhat on the ions being exchanged, the temperature of the ion exchange bath, and the anticipated service conditions. For maximum impact resistance, it has been found that, where sodium ions are being exchanged for lithium ions, the time of treatment should be on the order of ten to fifteen minutes at a temperature about 50° C. below the glass strain point. With either shorter or longer treatment times, lesser impact resistance is attained. With lower treatment temperatures, somewhat longer times would be employed to attain maximum strengthening, while somewhat shorter times might be employed with higher temperature treatments. Likewise, where relatively deep ion exchange to resist severe abrasion is necessary, a somewhat longer time might also be employed even at the risk of losing some impact resistance.

Normally, there is a tendency of molten salts to climb on the glass wall. This, plus the tendency for some lateral ion movement within the glass, provides an adequate stress gradient to avoid fracture or ringing off at the zone between the treated portions of the article. However, for greater safety, a zone of gradient stress may be introduced by holding the glass article in such a manner that it may be gradually immersed to a greater degree, or correspondingly withdrawn from the bath during the course of the treatment.

In discussing the salt bath quench earlier, it was noted that this was preferable in order to provide overall ion exchange to a very slight depth. It has been found that exchange of ions within a very shallow zone on the glass surface improves greatly the scuff or scratch resistance of the glass, that is, the resistance of the glass surface to being marred by rubbing contact with abrasive materials or surface. The depth of exchange need only be very shallow to impart this scratch resistance, probably not more than about 5 mils in depth, and should be insufficient to impart any appreciable degree of compressive stress. Otherwise, the differential strengthening effect, as hereafter described, will be at least in part lost. Therefore, the time of quench in the salt bath should preferably not exceed about one minute.

The invention is further described with reference to the accompanying drawing wherein.

Figure 1:
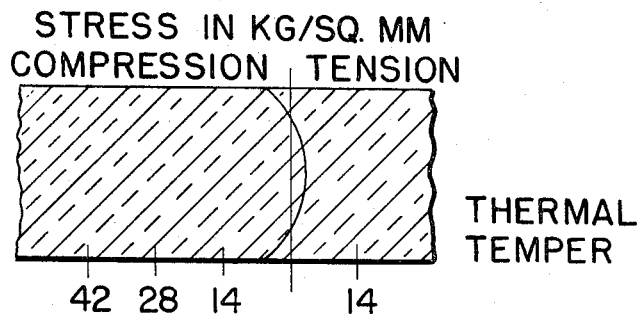
FIGURE 1 illustrates a typical stress profile in a flat body of thermally tempered glass.
Figure 2:
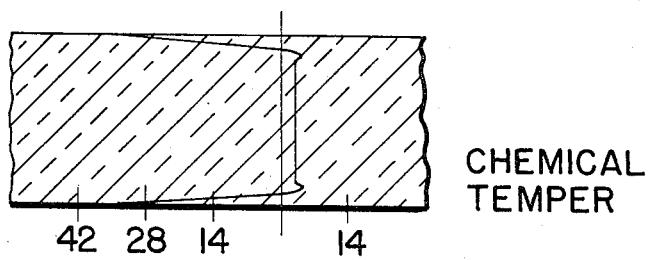
FIGURE 2 illustrates a typical stress profile in a flat body of ion exchange strengthened glass.
Figure 3:
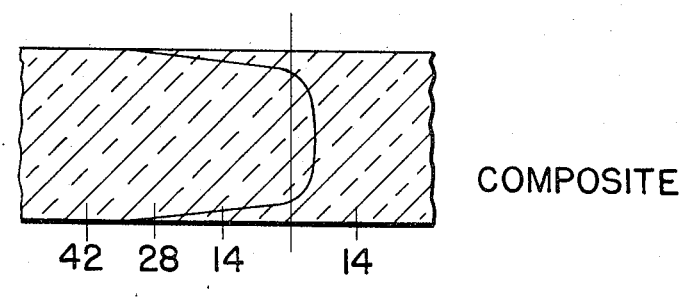
FIGURE 3 illustrates a typical stress profile in the appurtenant portion of a flat body of glass treated in accordance with the present invention.

In FIGURES 1, 2, and 3, the horizontal lines represent the surfaces of a flat glass body. The vertical line centrally positioned in each figure portrays the thickness of the glass body and serves as a reference line, i.e., a hypothetical line representing a condition of zero stress in the glass, a condition characteristic of perfectly annealed glassware. This line permits the drawing of a plotted curve indicating the magnitude, type, and rate of change of stress at any given depth in the body.

Hence, in FIGURES 1, 2, and 3, stress values to the left of the vertical line, plotted in thousands of pounds per square inch, are compression stresses while stress values to the right of the vertical line are tension stresses. The horizontal displacement of any point on the resulting stress profile curve reflects the magnitude of stress at the corresponding depth in the body. And, the intercepts of the stress profile curve and the vertical line depict the depth of the compression layer in the body, or, in other words, the plane at which the type of stress in the glass body changes from compressive to tensile.

This point or depth at which the transition from compressive stress to tensile stress occurs may be referred to as the effective depth of the compression layer. In the typical thermal tempering process discussed above, the depth of this transition is about 15–20 mils. The stress distribution pattern illustrated in FIGURE 1 can be varied somewhat by the heat treatment temperature employed, the temperature and composition of the chilling medium, and the thickness of the glass article involved.

FIGURE 2 shows a typical stress distribution pattern obtained by chemically strengthening glass, in particular by exchanging a larger ion for a smaller ion at a temperature below the strain point of the glass. This system is characterized by a high compression on the surface but the depth of layer is preferably maintained within a critical range. Long treatment times have the effect of increasing the depth of layer but are undesirable because of the explosive character of the breakage and economy.

This method of ion exchange strengthening is especially useful with articles produced from alkali aluminosilicate glasses and alkali zirconia silicate glasses. Such glasses are unique in that very high strengths can be attained therein by chemical strengthening and these strengths are maintained even after the surfaces thereof have been abraded to simulate normal service conditions. These glasses typically contain, by weight, about 5–25% of at least one alkali metal oxide, about 5–25% of $Al_2O_3$ and/or $ZrO_2$, and the remainder essentially $SiO_2$. Various compatible metal oxides may be present in minor amounts, the total of such not exceeding about 20% by weight.

The stress profile recorded in FIGURE 2 was plotted from values obtained by chemically strengthening a lithium aluminosilicate glass article. A bar ¼″ x ¼″ x 4″ was cut from an annealed casting of a glass having the following approximate composition in weight percent:

| | |
|---|---:|
| $SiO_2$ | 65.4 |
| $Al_2O_3$ | 20.8 |
| $Na_2O$ | 8.7 |
| $K_2O$ | 0.1 |
| $MgO$ | 1.0 |
| $Li_2O$ | 4.0 |

This glass had a softening point of 797° C., an annealing point of 550° C., and a strain point of 506° C. The bar was immersed in a molten sodium nitrate ($NaNO_3$) bath maintained at 450° C. for two hours to promote the exchange of sodium ions from the bath with the lithium ions in the glass surface. The stress profile illustrated in FIGURE 2 is characteristic of those observed when glass articles are chemically strengthened utilizing a time-temperature cycle ranging from several minutes at a temperature in the vicinity of the strain point of the glass to several hours at a temperature of about 50°–100° C. below the strain point of the glass.

FIGURE 3 records the stress profile of the composite compression layer present in the appurtenant portion of a glass article having the compositions set out in the description of FIGURE 2. The appurtenant portion was first thermally tempered in the manner described above with reference to FIGURE 1 and then chemically strengthened according to the procedure outlined in connection with FIGURE 2.

Figure 4:
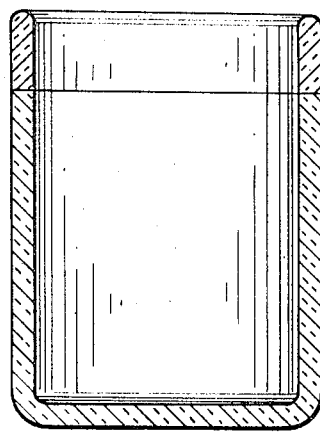
FIGURE 4 illustrates, in cross section, a tubular glass article treated in accordance with the invention.

FIGURE 4 is a view, in cross section, of a tubular glass article, such as a tumbler, illustrating the appurtenant and principal portions of the glass body. As described therein, the rim portion of the article is the appurtenant portion thereof and this area is subjected to thermal tempering followed by an ion exchange strengthening process. The remainder of the article is thermally tempered only. Thus, the rim portion has the composite type of stress profile set out in FIGURE 3 which provides excellent resistance to surface impact and good protection against delayed breakage while the remainder of the article manifests the stress profile illustrated in FIGURE 1.

Experience has demonstrated that some of the stress induced in the glass article during thermal tempering is released even under the relatively mild heating conditions required in the ion exchange strengthening process. This stress release lessens the depth of the compression layer generated through thermal tempering and, in so doing, is believed to increase the likelihood of delayed breakage. Therefore, in glass articles where an appurtenant portion, e.g., the rim of a tumbler, is highly vulnerable to surface impact a composite stress profile as in FIGURE 3 is most advantageous; but in those areas where delayed breakage is of major concern, a deeper compression layer where the magnitude of the compressive stress is not excessive; such as is illustrated in FIGURE 1, is most desirable. The magnitude of the compressive stress cannot be so great as to engender explosive breakage.

In order to provide a comparison between the products treated in accordance with the procedure of the present invention and those subjected to a combination of thermal tempering plus chemical strengthening such as to manifest the stress profile demonstrated in FIGURE 3, eighty-eight (88) 8-ounce straight wall tumblers were made from the above-recited glass composition and treated in accordance with the procedure of the present invention. A second group of 88 tumblers was made and treated to exhibit the stress profile of FIGURE 3 throughout the entire body. A tumble test was devised wherein eight tumblers were placed in a wire basket 10½″ x 10″ x 6¼″ and this basket then rotated for five minutes at 12 r.p.m. After this tumbling together, the tumblers were placed in a commercial (restaurant-type) dishwasher where the wash water temperature is about 140° F. and the final rinse temperature is about 180° F. This test was designed to simulate the type of impact which has been found to cause bruise checks in tumblers and similar kinds of products. No delayed breakage occurred in the 88 tumblers treated in accordance with the method of the present invention, while 10% of the tumblers so treated as to exhibit the stress profile of FIGURE 3 throughout showed delayed breakage.

The superiority of the product formed by the method of my invention in resisting delayed breakage was dramatically demonstrated in a six month actual service test. Eighty (80) 8-ounce straight wall tumblers produced from the above-recited glass composition were divided into two groups of forty (40). The first group was treated in accordance with the method of my invention and the second was treated to produce the stress profile of FIGURE 3 throughout the tumbler. The two groups were then placed in the same restaurant so that the service experience would be essentially identical. After six months' service, no delayed breakage occurred in the first group of tumblers whereas about 50% of the second group broke spontaneously due to bruise checks. This service test underscored the pervasiveness of ware loss due to bruise checks and demonstrated that only a test continuing for an extended period of time is effective in determining resistance to breakage due to bruise checks.

I claim:

1. A thermally tempered and ion exchange strengthened glass article having an appurtenant portion wherein the improvement comprises said article having a composition selected from the group consisting of alkali aluminosilicate and alkali zirconia silicate glasses and said appurtenant portion having a deeper ion exchange strengthened zone than the remainder of the article.

2. A method for strengthening a hollow glass article, having an appurtenant portion and consisting of an ion exchangeable glass selected from the group consisting of alkali aluminosilicate glasses and alkali zirconia silicate glasses, comprising the steps of:
   (a) thermally tempering the entire glass article,
   (b) subjecting the entire thermally tempered article to a large-ion-for-small-ion exchange at a temperature below the strain point of the glass, and
   (c) subjecting the appurtenant portion of the thermally tempered and chemically ion exchanged article to a further large-ion-for-small-ion exchange at a temperature below the strain point of the glass.

References Cited

UNITED STATES PATENTS 3,287,200   11/1966   Hess et al. _____ 161—1

DONALL H. SYLVESTER, *Primary Examiner.*

JOHN H. HARMAN, *Assistant Examiner.*

U.S. Cl. X.R.

65—30, 114, 115; 161—166